United States Patent
Riley et al.

(10) Patent No.: US 10,764,942 B2
(45) Date of Patent: Sep. 1, 2020

(54) SYSTEMS, APPARATUSES, AND METHODS FOR PROVISIONED NETWORKING

(71) Applicant: Echelon Corporation, San Jose, CA (US)

(72) Inventors: Glen M. Riley, Saratoga, CA (US); Vijay Dhingra, San Jose, CA (US)

(73) Assignee: Echelon Corporation, Santa Clara, CA (US)

( * ) Notice: Subject to any disclaimer, the term of this patent is extended or adjusted under 35 U.S.C. 154(b) by 38 days.

(21) Appl. No.: 14/682,979

(22) Filed: Apr. 9, 2015

(65) Prior Publication Data
US 2016/0302243 A1    Oct. 13, 2016

(51) Int. Cl.
| | |
|---|---|
| H04W 76/11 | (2018.01) |
| H04B 3/54 | (2006.01) |
| H04W 76/38 | (2018.01) |
| H04W 76/12 | (2018.01) |
| H04W 88/16 | (2009.01) |
| H04W 4/70 | (2018.01) |

(52) U.S. Cl.
CPC .............. *H04W 76/11* (2018.02); *H04B 3/54* (2013.01); *H04W 4/70* (2018.02); *H04B 2203/5458* (2013.01); *H04W 76/12* (2018.02); *H04W 76/38* (2018.02); *H04W 88/16* (2013.01)

(58) Field of Classification Search
CPC . H04W 76/021; H04W 4/005; H04W 76/068; H04W 76/11; H04W 76/38; H04W 4/70; H04W 88/16; H04W 76/12; H04B 3/54; H04B 2203/5458
See application file for complete search history.

(56) References Cited

U.S. PATENT DOCUMENTS

| | | | | |
|---|---|---|---|---|
| 6,427,170 | B1* | 7/2002 | Sitaraman | H04L 29/12066 709/226 |
| 6,856,254 | B1* | 2/2005 | Tanaka | H04L 12/2803 340/687 |
| 7,577,769 | B2* | 8/2009 | Cobb | G06F 9/4411 710/18 |
| 2005/0111384 | A1* | 5/2005 | Ishihara | H04L 12/5692 370/254 |

(Continued)

OTHER PUBLICATIONS

International Preliminary Report on Patentability for Application No. PCT/US2016/026702, dated Oct. 19, 2017, 8 pages.

(Continued)

*Primary Examiner* — Christopher P Grey
(74) *Attorney, Agent, or Firm* — Nicholson De Vos Webster & Elliott LLP (57) ABSTRACT

Systems, methods, and apparatuses for network provisioning are described. In some embodiments, an apparatus comprises a processor to execute instructions stored in memory; a communication interface coupled to the processor to communicate with an external device; and memory to store instructions which when executed by the processor to provide provisioning capabilities for the apparatus, wherein the memory to further store a node information structure including identifiers for each node coupled to the apparatus, an indication of if each node was automatically added by the apparatus, and a timer to indicate how long to maintain a connection to each node.

20 Claims, 7 Drawing Sheets

(56) References Cited

U.S. PATENT DOCUMENTS

| | | | | |
|---|---|---|---|---|
| 2005/0251549 | A1* | 11/2005 | Hlasny | H04L 12/2803 709/203 |
| 2006/0067213 | A1* | 3/2006 | Evans | H04L 45/00 370/229 |
| 2007/0057807 | A1 | 3/2007 | Walters et al. | |
| 2007/0124447 | A1* | 5/2007 | Ajitomi | H04L 12/2832 709/223 |
| 2008/0101384 | A1* | 5/2008 | Lee | H04W 40/14 370/400 |
| 2009/0034419 | A1 | 2/2009 | Flammer, III et al. | |
| 2009/0303531 | A1* | 12/2009 | Abe | G06Q 30/02 358/1.15 |
| 2010/0274998 | A1* | 10/2010 | Rogers | G06F 9/4411 713/2 |
| 2010/0316021 | A1* | 12/2010 | Lerzer | H04W 88/06 370/331 |
| 2011/0044276 | A1 | 2/2011 | Albert et al. | |
| 2011/0161480 | A1* | 6/2011 | Kim | H04L 12/2809 709/223 |
| 2012/0137346 | A1* | 5/2012 | Lee | G06F 21/606 726/4 |
| 2012/0221652 | A1* | 8/2012 | Sainio | H04L 63/101 709/206 |
| 2013/0003749 | A1* | 1/2013 | Murphy | H04L 12/2818 370/401 |
| 2013/0013091 | A1* | 1/2013 | Cavalcanti | H05B 37/0272 700/90 |
| 2014/0273958 | A1* | 9/2014 | Messana | H04L 63/0884 455/411 |
| 2014/0297889 | A1* | 10/2014 | Dong | H04L 61/103 709/245 |
| 2017/0273165 | A1* | 9/2017 | Sung | G06Q 50/10 |

OTHER PUBLICATIONS

International Search Report and Written Opinion for Application No. PCT/US2016/026702, dated Jul. 7, 2016, 9 pages.

\* cited by examiner

| 0 | 1 | 2 | 3 | 0 | 1 | 2 | 3 | 0 | 1 | 2 | 3 |
|---|---|---|---|---|---|---|---|---|---|---|---|
| 4 | 5 | 6 | 7 | 4 | 5 | 6 | 7 | 4 | 5 | 6 | 7 |
| 8 | 9 | A | B | 8 | 9 | A | B | 8 | 9 | A | B |
| C | D | E | F | C | D | E | F | C | D | E | F |
| 0 | 1 | 2 | 3 | 0 | 1 | 2 | 3 | 0 | 1 | 2 | 3 |
| 4 | 5 | 6 | 7 | 4 | 5 | 6 | 7 | 4 | 5 | 6 | 7 |
| 8 | 9 | A | B | 8 | 9 | A | B | 8 | 9 | A | B |
| C | D | E | F | C | D | E | F | C | D | E | F |
| 0 | 1 | 2 | 3 | 0 | 1 | 2 | 3 | 0 | 1 | 2 | 3 |
| 4 | 5 | 6 | 7 | 4 | 5 | 6 | 7 | 4 | 5 | 6 | 7 |
| 8 | 9 | A | B | 8 | 9 | A | B | 8 | 9 | A | B |
| C | D | E | F | C | D | E | F | C | D | E | F |

SYSTEMS, APPARATUSES, AND METHODS FOR PROVISIONED NETWORKING

FIELD OF INVENTION

The field of invention relates generally to networking, and, more specifically, to provisioning.

BACKGROUND

Modern commercial outdoor lighting systems are being asked to do more than ever before. In addition to fulfilling their primary purpose of casting light onto dark roadways, parking areas, and public spaces, outdoor lighting systems are increasingly evaluated for how well they reduce energy consumption, improve safety for both pedestrians and drivers, and serve as the foundation for a range of Internet of Things (IoT) applications.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Detailed below are embodiments of systems, apparatuses, and methods to provide provisioned networking. In particular, the embodiments detailed below allow for simpler installation of controlling devices on a network. Throughout this description the provisioned networking may be referred to as Plug-n-play Provisioned Networking ("PPN"). Through PPN, gateways (including other components such as servers and border routers (BR), etc.) and nodes (for example, powerline outdoor lighting controller (PL OLCs), radio frequency (RF) OLCs, sensors, etc.) may be installed (provisioned). Of course, once added (provisioned) to a gateway, the gateway and node communicate with each other such that the gateway may be used to provide commands to the node such as configurations.

Note that throughout this document when the term "property" is used, it is assumed that this means, for the gateway, a value or set of values gettable/settable via a web page or via simple object access protocol (SOAP). For the node, it means a value or set of values gettable/settable via network management messages. In any case, properties are persistent.

Exemplary Architectures and Devices

Figure 1:
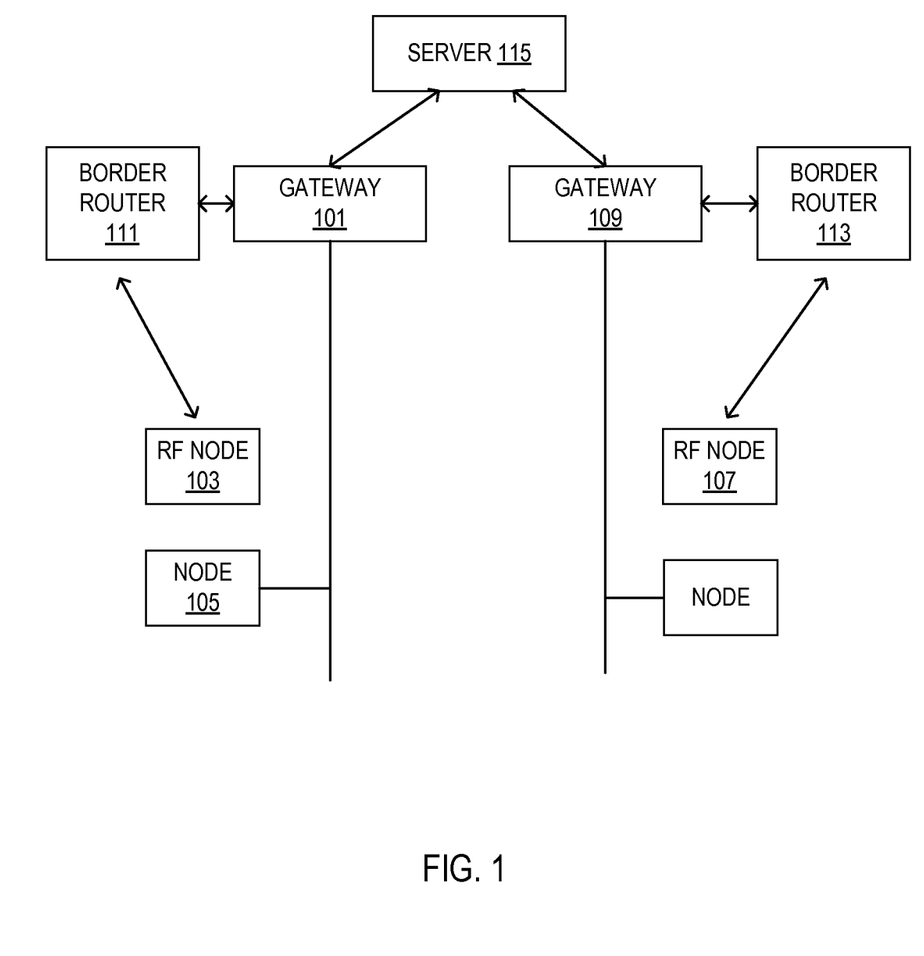
FIG. 1 illustrates an embodiment of an exemplary system that utilizes PPN.

FIG. 1 illustrates an embodiment of an exemplary system that utilizes PPN. A head-end server 115 is used to design, install, or maintain networks, channels, devices (e.g., application devices such as PL or RF OLC, etc. and routers), functional blocks, and data points. For example, the head-end server 115 may use a discovery procedure such as that detailed below to add nodes to a network. In some embodiments, the head-end server maintains a "blacklist" of nodes that are not allowed to join a network or gateway. In most deployments, the server 115 is used for control of, and communication, with coupled nodes.

In communication with the server 115, and coupled thereto, are one or more gateways 101, 109 which interface with border routers 111, 113. The gateways 101, 109 are capable of interfacing with networks that use different protocols. For example, receiving and transmitting powerline communications from PL nodes such as node 105 or wireless communications from nodes 103, 107 and also communicating with server 115. The gateways 101, 109 may also manage and control a plurality of nodes as shown.

Border routers 111, 113 couple to gateways 101, 109 respectively and provide an interface to wireless networks (if the gateways 101, 109 do not already do so). In some embodiments, the border routers are a part of the gateways.

The architecture of a gateway 101, 109 with a border router 111, 113 and nodes 103, 105, 107 allows for scalable control and monitoring of the nodes 103, 105, 107. In some embodiments, the gateways 101, 109 have features such as a built-in astronomical clock and scheduler, which can be used to switch their networks of nodes on and off based on fixed or sunrise/sunset timings for that particular location. Additionally, the gateways 101, 109 talk to an energy meter to collecting data for an entire segment handled by the gateway 101, 109 to be used for billing and analytics. Gateways 101, 109 communicate remotely with the server 115 via hardwired TCP/IP, 3G modem, GPRS connections, etc.

In some embodiments, for the server 115 to track what is going on in the network, events are sent from the gateways 101, 109 to the server 115 on certain changes. For example, the gateways 101, 109 alert the server 115 when: a node is added, a node is removed, and/or when a node is rejected. In some embodiments, the node add notification includes the added node's ID, the number of hops, and the worst case link quality indication (LQI) of any hop. In some embodiments, the node remove notification in sent when a node is automatically removed by the gateway 101, 109 due to hold time violation (detailed below). In some embodiments, a node rejection notification is sent when a node associates with a gateway, but is rejected either due to a blacklist or a maximum route cost (MRC) violation. The information of this notification are a rejection reason, the number of hops, and the worst case LQI of any hop.

Figure 2:
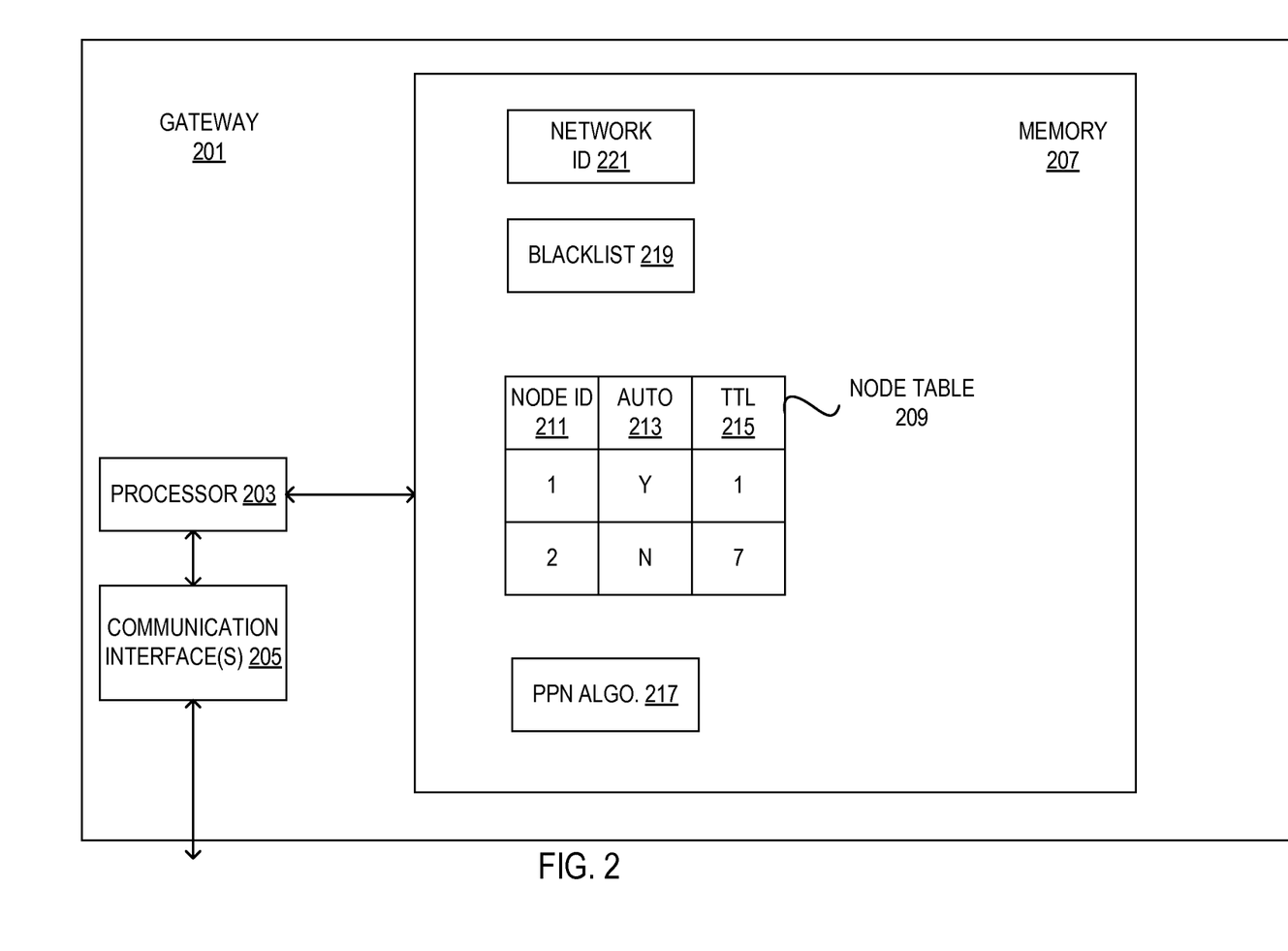
FIG. 2 illustrates an exemplary embodiment of a gateway.

FIG. 2 illustrates an exemplary embodiment of a gateway. The gateway includes a hardware processor 203, such as a microcontroller or central processing unit, to execute instructions stored in memory 207. The gateway 201 typically includes a property indicating whether PPN is enabled.

Memory 207 may be one or more types of read-only memory (ROM) and/or writeable memory such as random access memory (RAM) or non-volatile storage such as FLASH or disk. The memory 207 includes one or more of: a network identification 221 of the gateway 201, a blacklist 219 of nodes that are not allowed to communicate with the gateway 201, one or more node information data structures 209 (such as a table), and one or more PPN algorithms 217 to perform embodiments of one or more of the methods detailed herein. In some embodiments, the blacklist is a list of MAC IDs that it will not be automatically added. The server provides that list 219 in most scenarios. In an embodiment, the node table 209 includes fields for node IDs 211, a Boolean indication of if the node was automatically added (e.g., via PPN) 213, and a time to live (TTL) value 215 (also called a hold time). Typically, the TTL is used for any node that was automatically added, and when the node is out of communication for longer than the time value, the node is automatically removed. The TTL 215 may be updated to reflect the passage of time or be a "static value" and a separate counter is kept to track the passage of time.

The gateway 201 includes at least one communication interface 205. For example, the gateway 201 may include one or more of: a wireless interface, one or more identification buttons, a powerline communication interface, etc. For example, the communication interface(s) 205 may include ISO 14908-1, IEEE 802.15.4, 6LoWPan, etc. In other embodiments, some of these interfaces (e.g., wireless ones) are provided by a border router.

Figure 3:
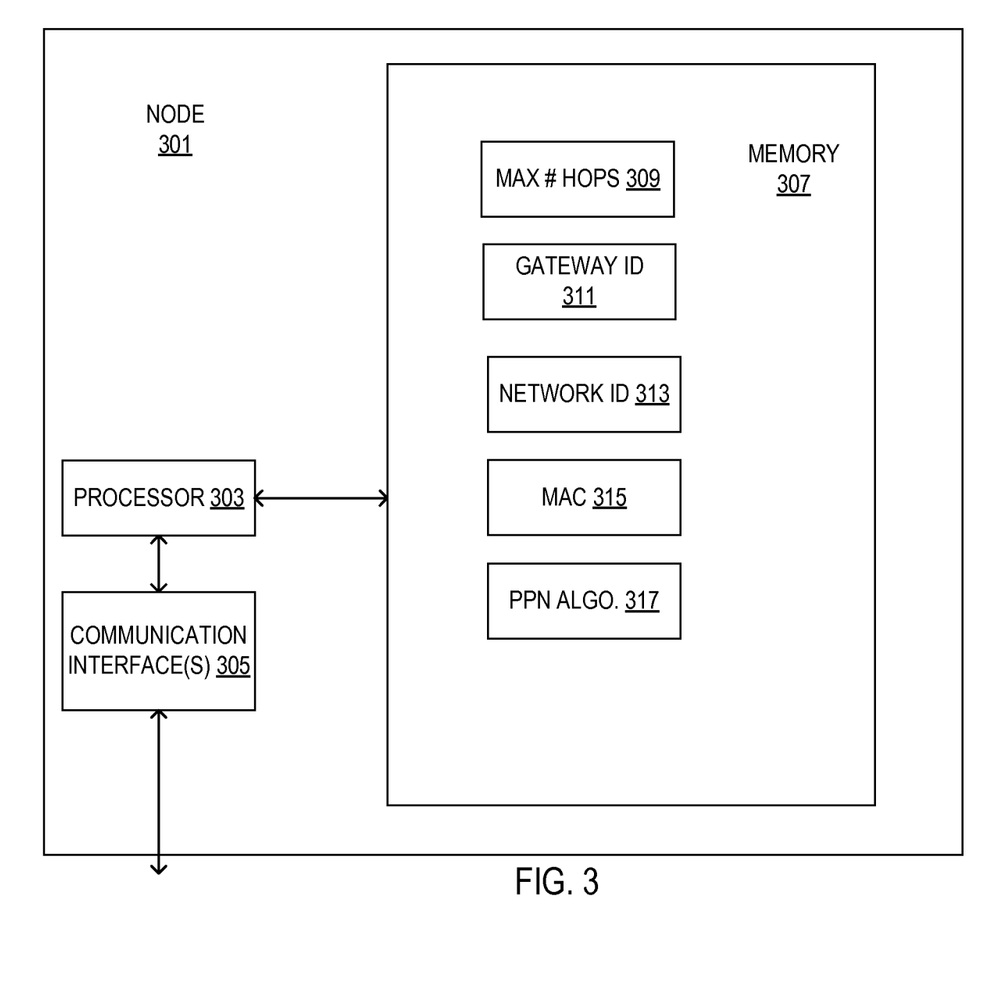
FIG. 3 illustrates an exemplary embodiment of a node.

FIG. 3 illustrates an exemplary embodiment of a node. The description herein may apply to a PL node or a RF node. The node 301 includes a hardware processor 303, such as a microcontroller or central processing unit, to execute instructions stored in memory 307. The node 301 typically includes a property indicating whether PPN is enabled.

Memory 307 may be one or more types of read-only memory (ROM) and/or writeable memory such as random access memory (RAM) or non-volatile storage such as FLASH or disk. The memory 307 includes one or more of: a maximum number of allowed hops to reach a destination (such as a gateway, server, or router) 309, a gateway ID 311 for the gateway it is coupled to, a network ID 311 of the node, a media access control (MAC) 315, and one or more PPN algorithms 317 to perform embodiments of one or more of the methods detailed herein. The node 301 includes at least one communication interface 305. For example, the node 301 may include one or more of: a wireless interface, one or more identification buttons, a powerline communication interface, etc. For example, the communication interface(s) 305 may include ISO 14908-1, IEEE 802.15.4, 6LoWPan, etc. In other embodiments, some of these interfaces (e.g., wireless ones) are provided by a border router. For example, in some embodiments, an RF node (such as an RF OLC) uses one or more of ISO 14908-1, IEEE 802.15.4, and/or 6LoWPAN compliant wireless communications. For example, in some embodiments, a PL node (such as a PC OLC) uses ISO 14908-1 and -3 powerline based two way communication interfaces.

PPN leverages discovery mechanisms that are typically available with nodes. In general, when a gateway discovers a node it adds the node to itself. However, the gateway should also continue to allow non-automatic (manual) adding of nodes.

Node Addition at a Gateway

Figure 4:
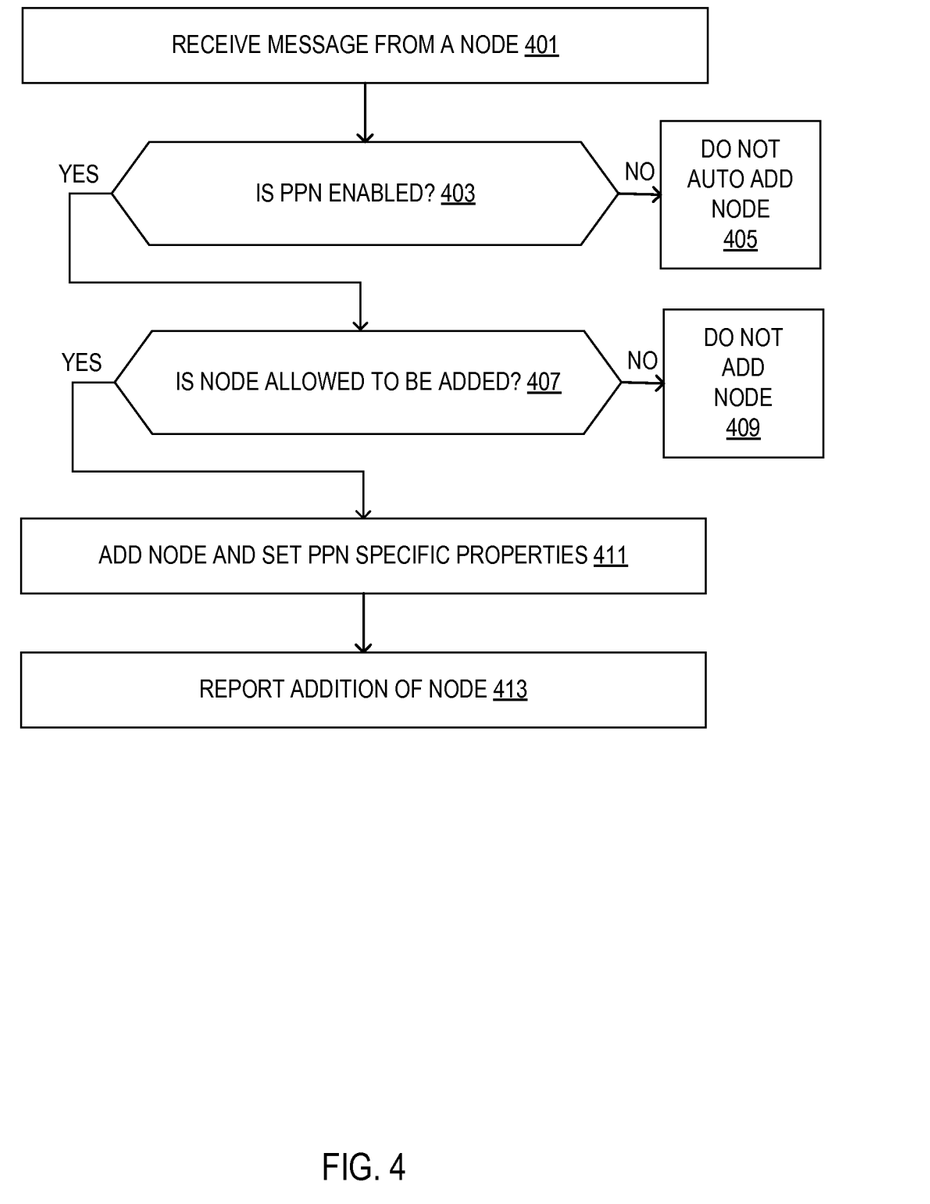
FIG. 4 illustrates an embodiment of PPN based node addition to a gateway.

FIG. 4 illustrates an embodiment of PPN based node addition to a gateway. At 401, a message is received by the gateway at 401. Through this message a gateway discovers a node via the node's announcement of itself to the gateway. For example, nodes may send a unicast message to a gateway announcing their presence. In some embodiments, this unicast message is an identificationmessage. Typically, RF nodes send a unicast addressed to a border router coupled to the gateway using a border router's known fixed address and the border router then relays this to the gateway, however, more direct communication is contemplated. PL nodes may interact either directly with the gateway or through an intermediary. The unicast message is normally sent on a periodic basis when the node is unconfigured. Once configured, the nodes stop sending this message. Further, the rate of identification messages may change such that a delay between sending these messages increases after each transmission.

In some embodiments, at 403, a determination of if PPN is enabled is made by the gateway. PPN may be determined by a setting of the gateway such as a flag or register value being set. If PPN is not enabled, then by default the node is not added automatically at 405 in some embodiments.

If PPN is enabled, a determination of is the node allowed to be added is made at 407. For example, is the node subject to a blacklist or does it suffer from a MRC violation? As noted above, a blacklist is typically provided by the server that the gateway is coupled to and a check against that list for the node's ID is made. If the ID is found, then the node is not added at 409. Turning to a potential MRC violation (route limiting), in most embodiments, in each PL and RF node there is a maximum number of hops (e.g., 8 and 15 respectively) that can be used but these maximums may greatly increase the odds of an incorrect assignment. Therefore, route limiting defines a MRC property per channel in the gateway. An MRC violation is determined by comparing the MRC against an actual route cost and if the actual route cost is higher than the MRC, the node is not added at 409. Rather than attempt to create a single route cost number that reflects hops to the gateway and signal strength, the route cost consists of two parts, a number of hops to the gateway and a worst case margin/link quality indication (LQI) value. The worst case margin/LQI value is the lowest value for any single hop. If either the MRC hop limit is exceeded or the margin/LQI is below the MRC value, the node is rejected and not added at 409.

If allowed, the node is added to the gateway at 411 and PPN specific properties are set in the gateway such as the node ID, auto-populated indication, and TTL indication.

In some embodiments, the addition of the node is reported to the gateway's server at 413.

In PL and RF PPN systems, a node could end up reaching more than one gateway and one potential issue is deciding which gateway will automatically add the node. Without having a "lockdown" mechanism to tie a node to a gateway, nodes could readily move between gateways, especially in an RF environment. For example, in FIG. 1, node 103 may be close enough to border routers 111 and 109 to potentially reach both of them and could bounce between them. In some embodiments, lockdown is accomplished by using a variety of network IDs wherein each gateway uses a specific network ID with up to "N" network IDs used in a particular installation. The gateway and each node have a property which is the maximum number of network IDs that are possible called the network ID maximum (NIM). When unconfigured and searching for a gateway (e.g., on power up or after a disassociation), an RF node cycles through all the possible NIDs from 0 to NIM-1. In some embodiments, a node's network ID is formed by setting the last byte of the IEEE 802.15.4 network ID to a number in this range and this identification is called the PPN Network ID (PNI). In some embodiments, a network ID is a 16-byte number used by an application's 802.15.4 stack to constrain end nodes in terms of which border router that it can associate with. The end node and BR each have a network ID and the end node won't associate unless the BR has a matching ID. Once an end node associates, it is then given an address in the PAN (consisting of the PAN ID and a 16-bit node number). After that, the network ID doesn't come into play (thus the need for a PAN ID uniqueness even in disparate networks). Without network IDs, there is no way to keep a node from system A, vendor X from associating with a border router from system B, vendor Y.

In some embodiments, the server can opt for a one or more strategies regarding PNI assignments. One strategy is to start out with unique PNIs and the other is to use a common PNI. For example, if all gateways are given PNI 0 initially, then this significantly increases the chances that during initial installation a node will find a gateway on its first try. Once a certain percentage (i.e., the vast majority) of the nodes are found, the server could at that point switch PNIs to unique values and effect a lockdown. The process of locking down nodes is a generalized use of the reassignment mechanism described below. Once a lockdown configuration is set, any new nodes (such as a replacement node) would have to work harder in the scan process In some embodiments, for a configured (commissioned) node or any gateway, its PNI is determined by taking the least four significant bytes of the domain ID modulo NIM.

Figure 5:
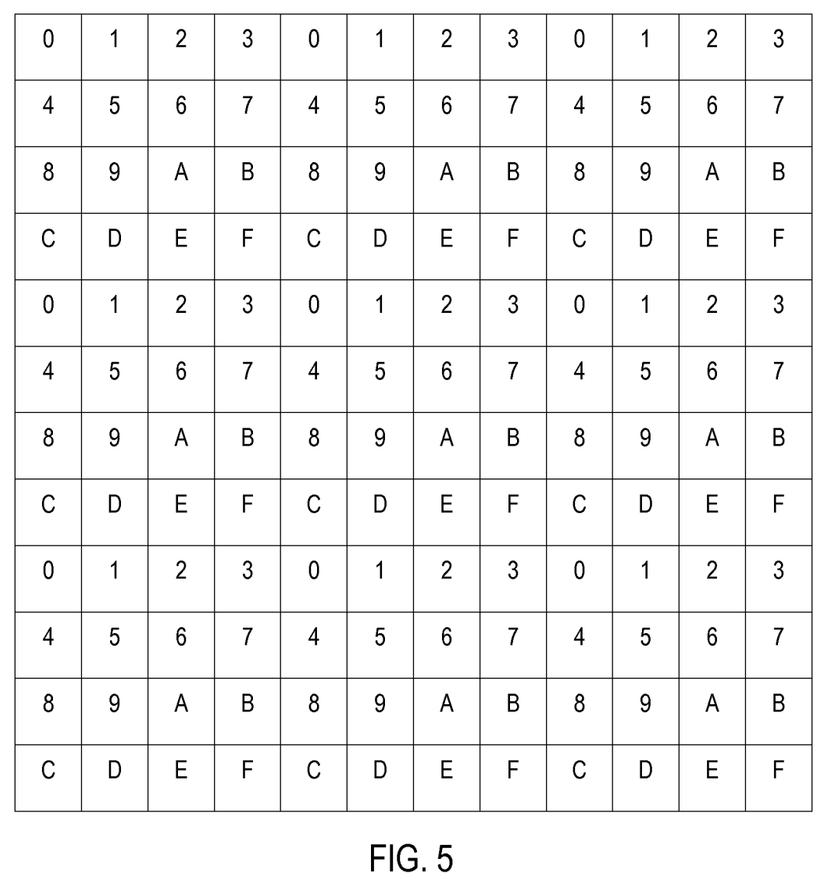
FIG. 5 illustrates an exemplary PNI based layout for choosing a NIM value.

When choosing an NIM value it is usually important to consider how likely a node will associate with the wrong border router and gateway. FIG. 5 illustrates an exemplary PNI based layout for choosing a NIM value. Assume the system consists of 144 border routers and 43,200 nodes and that each square represents a bridge router and its associated 300 nodes where the number in the middle is the PNI. A node that is associated with a border router using PNI 0 is unlikely to find its way to another border router with PNI 0. Even if it is possible for a node to find its way to the wrong border router, route limiting (detailed above) can be used to reduce the chances of this. If that still isn't good enough, blacklisting can be used to guarantee that the node doesn't get automatically added to the wrong border router.

The lockdown discussion above points out the need for uniqueness of PAN IDS in addition to network IDs. In some embodiments, a PAN ID is a 16-bit number defined by 802.15.4 to identify an IEEE 802.15.4 network and is assigned to end nodes by a border router. PAN IDs should not overlap between networks. Therefore, a given installation should be configured to use a certain range of PAN IDs. This way, if two independent systems are being installed in close proximity, they can arrange to use non-overlapping PAN ID ranges. For example, installation A might be configured to use PANs 0xC000-0xC6 and installation B might be configured to use PNI 0xD000-0xD6.

Node Association

Figure 6:
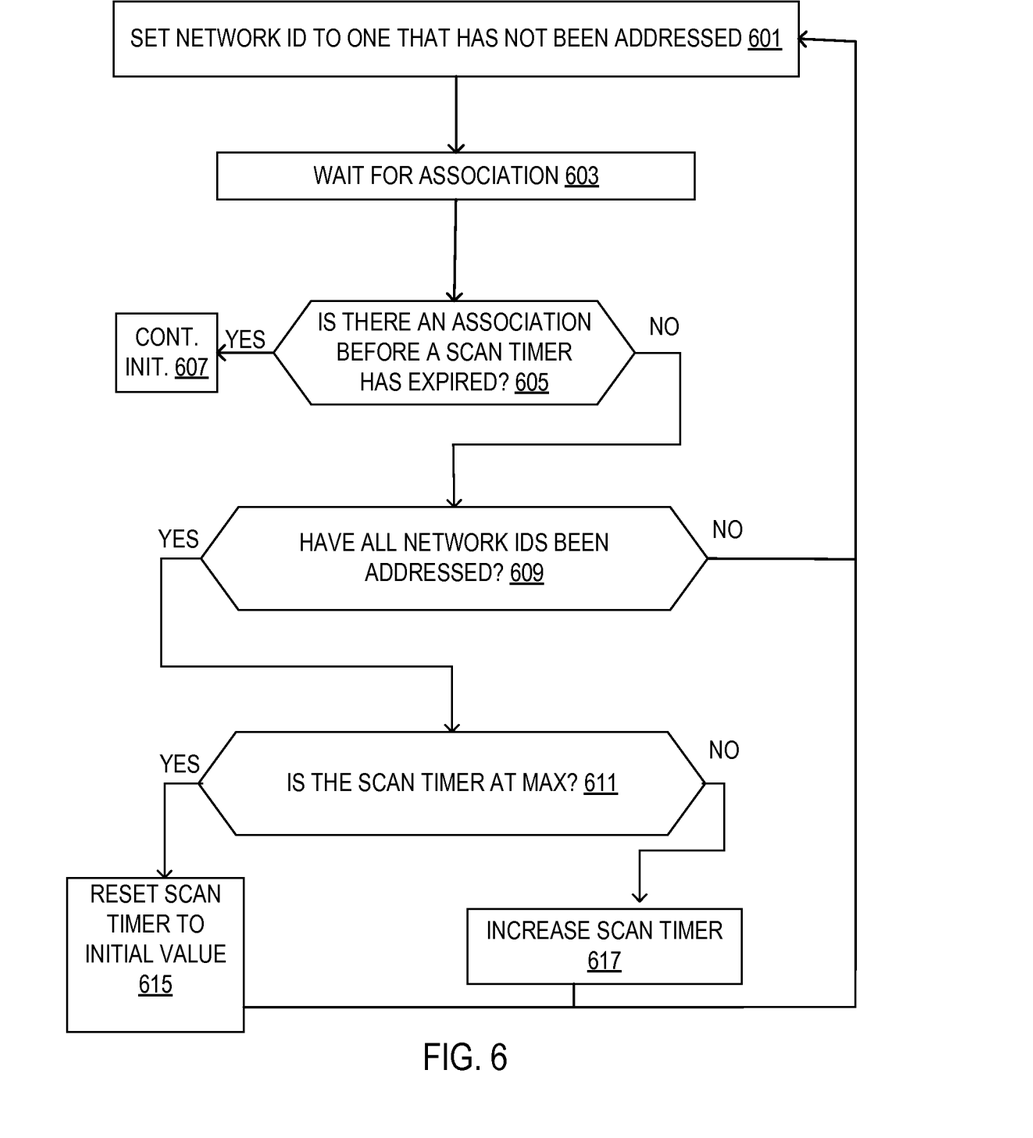
FIG. 6 illustrates an embodiment of a method for a node to associate with a gateway.

FIG. 6 illustrates an embodiment of a method for a node to associate with a gateway. In some embodiments, at 601, an application sets a network ID to a particular value (e.g., using a PNI). For example, the NID is one that has not been previously addressed.

At 603, the node waits for an association. A determination of if a scan timer has expired before association is made at 605. A scan timer is a node property that defines the maximum amount of time a node is to wait to get associated with a gateway before giving up and moving on to the next PNI. While not shown in FIG. 3, this is stored in memory of the node.

When there is an association before an expiration of the scan timer, any remaining initialization tasks may take place (as needed) and/or normal communications may begin at 607. When there is not an association before an expiration of the scan timer, then a determination of if all NIDs have been addressed by the node is made at 609. In some embodiments, NIDs are addressed sequentially. However, in other embodiments, other approaches are used such as search tree based.

When all NIDs have not been addressed, the node sends a message to a network ID for a gateway that it has not addressed before after setting a different network ID at 601.

At 611, a determination of if the scan timer is at a maximum value is made. The maximum value is usually stored in the node. If the scan timer is not at a maximum value, then it is increased at 617 and a new set of unicast messages are sent out (restarting the process with the first addressed address) at 601. If the timer is maxed out, then the scan timer is reset to its initial value at 615 and the process starts over at 601. In this adaptive approach, the scan timer begins at a value less than the maximum (e.g., 2 minute) and is increased at least once until the maximum value is reached (e.g., 10 minutes).

Lost Connection

Nodes can lose their connection to gateways. When a node detects that it has lost its connection to a gateway, it will attempt to find a new gateway (RF) or will become discoverable again (PL). In some embodiments, each node has a property called a heal timer (not shown in FIG. 3, but stored in memory) to define an amount of time it can go without getting a periodic all ok (AOK) message from the gateway.

The gateway sends this message at a rate once every N minutes, where the rate is a gateway property called the AOK Timer. This may be determined by reading the node heal timer from each node and dividing it by a set number such as two or four. Once this heal time is exceeded, the node de-commissions itself so it can be discovered by another gateway.

Figure 7:
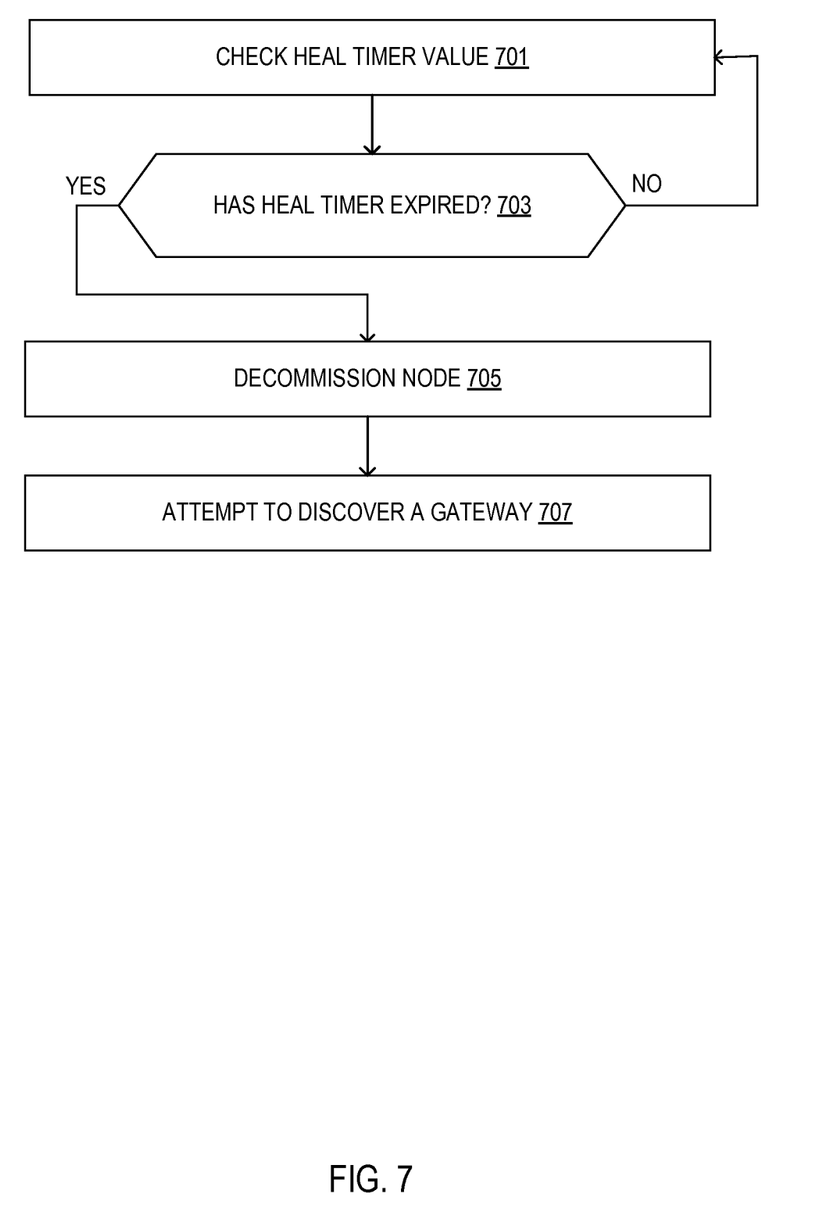
FIG. 7 illustrates an embodiment of a method for handling a lost connection.

FIG. 7 illustrates an embodiment of a method for handling a lost connection. At 701, the node reads its heal timer to get its value. A determination of if the heal timer has expired is made at 703, if it has not then the heal timer is checked again at a later point in time.

When the heal timer has expired, the node decommissions itself at 705 and attempts to discover a different gateway at 707. For example, the method of FIG. 6 is performed.

On the gateway side, the hold timer (TTL) will eventually expire causing the gateway to remove the node from its list of added or provisioned nodes.

Node Reassignment

In some instances, it may be beneficial to reassign a node from one gateway to another. When a node is removed from a gateway, it is de-commissioned. The act of de-commissioning puts the node in a state where it can be discovered by another gateway. The de-commission from the gateway will issue a command to start this process. In order to avoid causing network disruptions, the disassociate command usually includes a time to wait before switching network IDs value. In some embodiments, the disassociate command will also include a parameter that specifies a recommended PNI. The node will use this preferentially as it searches for an optimal gateway. Usually, the gateway would get this from the blacklist, if specified.

If an RF node becomes associated with a gateway's border router and the gateway rejects the node for some reason (e.g., blacklisting, route limiting), then the gateway issues a disassociate command.

In some embodiments, the server examines the route cost for each node, GPS coordinates of the nodes and gateways and given that information, determine which nodes are not optimally associated. The server then forces a reassignment for those nodes by updating the blacklist and removing the nodes.

Handheld Device Provisioning

In some embodiments, a handheld device (e.g., smart phone) is used to provision the end node (e.g., with GPS coordinates) prior to pairing with a gateway. In some embodiments, additional actions are performed on top of what was described above. For example, when the end node comes up after a power cycle, it initially uses a PNI called the DPNI (for direct connect PNI). The end node remains on the DPNI for a configurable period of minutes or until disassociated, whichever comes first. Once switching away from the DPNI, the node starts its normal gateway association method (detailed above) and never tries the DPNI again.

EXAMPLES

Detailed below are examples of PPN usage and refer to the grid in FIG. 5 and in particular the upper left 4×4 set of 16 zones. Each zone in this grid represents a gateway with a PNI corresponding to the number in its square, specifically 0 to F. The notation gateway. 0 means a gateway/border router pair with PNI 0.

An example of initial gateway association is as follows. An RF OLC, X, is installed in gateway A's zone and X is only capable of associating with a subset of the border routers in this grid. For this example, let s assume it can reach gateway 6, gateway 9, gateway A, gateway B, and gateway E. X starts scanning for a border router by first setting its PNI to 0. After the scan timer expires without associating, it switches the PNI to 1. This repeats until X finally tries gateway 6 and successfully associates. Gateway 6 has PPN enabled, sees X associate, determines that X qualifies based on both the route limiting criteria and black list criteria and automatically adds X and commissions it. Gateway 6 begins to communicate with X on a regular basis and as long as X responds, it follows this up, on occasion (based on the AOK timer), with an AOK message to X. Whenever X receives the AOK message it restarts its Heal Timer.

An example of route limiting is as follows. The conditions above are modified such that X could also reach gateway 5, but that to do so required four hops. Let's assume the MRC in gateway 5 was set to accept nodes with no more than 3 hops and a worst case LQI of no less than 0x50. When X initially associates with gateway 5, gateway 5 would send X a disassociate command because it failed the MRC criteria. Since X was in the middle of a search, it would at that point move on to PNI 6 and then successfully associate with gateway 6.

An example of reassignment is as follows. After some scrutiny of the maps or based on some bindings that need to occur, a gateway user or a head end application (from here on in this is just called the head end) determines that X really should be associated with gateway A. To facilitate this, the blacklist of all the gateways within a reasonable radius of gateway A are updated to add the UID of X. Furthermore, the blacklist would include A as the recommended PNI. X is removed by the server from gateway 6. During the de-commission, gateway 6 sends X a disassociate command that includes A as the recommended PNI. X now joins network A and attempts to associate. It soon associates with gateway A and gateway A will add the device.

An example of healing is as follows. An impairment is introduced and after some period of time, X can no longer reach gateway A. X stops receiving AOK messages and eventually the heal timer expires. At this point X de-commissions itself and starts searching for a gateway. Meanwhile, gateway A has detected that X is lost and eventually its hold timer expires and it automatically removes X. The server decides that gateway 6 is likely a good alternative and removes X from gateway 6 s blacklist and adds X to gateway A's blacklist. The alternative could be selected based on a combination of the topology, the fact that X was at one time associated with gateway 6, and rejection events from the gateways to the server. If the server was right, then eventually X associates with and is added to gateway 6.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

We claim:

1. An apparatus comprising:
a processor to execute instructions stored in memory;
a communication interface coupled to the processor to communicate with an external device;
memory to store instructions which when executed by the processor are to provide provisioning capabilities for the apparatus, wherein the memory is to further store a node information structure including identifiers for each external device coupled to the apparatus, an indication of whether each external device was automatically added and provisioned by the apparatus or not, and a timer to indicate how long to maintain a connection to each automatically added external device, wherein when an automatically added external device is out of communication for longer than the timer it is automatically removed from the external device information structure and a external device will only be automatically added when plug and play provisioned networking is enabled to be used for automatically adding any external device as indicated in value set in the apparatus.

2. The apparatus of claim 1, wherein the external device is a server.

3. The apparatus of claim 1, wherein the external device is a powerline node.

4. The apparatus of claim 1, wherein the external device is a radio frequency node.

5. The apparatus of claim 4, wherein the radio frequency node is coupled to a outdoor lighting control.

6. The apparatus of claim 1, the apparatus is a gateway.

7. The apparatus of claim 1, wherein the memory to store a blacklist of external device that are to not be in communication with the apparatus.

8. The apparatus of claim 1, wherein the communication interface is one of an ISO 14908-1, IEEE 802.15.4, or 6LoWPan interface.

9. A method performed at a gateway, the method comprising:
receiving a message from a node to provision the node;
determining the node will be automatically added due to a global plug and play provisioned networking indication being set;
determining if the node is allowed to be provisioned;
when the node is allowed to be provisioned,
adding the node to a node information structure including an identifier for the node, an indication that the node was automatically provisioned, wherein nodes that are not automatically provisioned do not have this indication set, and a timer to indicate how long to maintain a connection to each automatically added node, wherein when an automatically added node is out of communication for longer than the timer it is automatically removed from the node information structure, and
communicating with the added node;
when the node is not allowed to be provisioned, not adding the node to the information structure and not communicating with the node.

10. The method of claim 9, wherein the determining if the node is allowed to be provisioned comprises determining if the node is on a blacklist stored at a gateway.

11. The method of claim 10, wherein the blacklist is supplied from and maintained by a head-end server.

12. The method of claim 9, wherein the determining if the node is allowed to be provisioned comprises determining if a route cost for the node violates a maximum route cost for a node.

13. The method of claim 12, wherein the route cost for the node comprises a number of hops and a worst case link quality indication value.

14. The method of claim 12, determining that automatic provisioning is enabled in the receiving device.

15. The method of claim 9, further comprising:
sending periodic messages to added nodes indicating that the communication between the added nodes and gateway is okay.

16. The method of claim 9, further comprising:
disassociating any node that does not communicate with the gateway after a period of time has expired.

17. A system comprising:
a head-end server to control provision of nodes on at least one network coupled to the head-end server;
a plurality of radio frequency nodes to control a plurality of devices on at least one of the networks;
a gateway to communicate to the radio frequency nodes, wherein the gateway comprises:
a processor to execute instructions stored in memory,
a communication interface coupled to the processor to communicate with the radio frequency nodes,
memory to store instructions which when executed by the processor to provide provisioning capabilities for the gateway, wherein the memory is to further store a node information structure including identifiers for each node coupled to the apparatus, an indication of whether each node was automatically added by the apparatus or not, and a timer to indicate how long to maintain a connection to each automatically added node, wherein when an automatically added node is out of communication for longer than the timer it is automatically removed from the node information structure.

18. The system of claim 17, wherein the system further comprises:
a plurality of powerline outdoor lighting controllers nodes coupled to the gateway.

19. The system of claim 17, wherein the plurality of radio frequency nodes control outdoor lighting controllers.

20. The apparatus of claim 1, wherein the memory is further to store at least one plug and play provisioned algorithm which is to leverage a discovery mechanism available in the apparatus.

* * * * *